DIGITAL SIGNAL SYNCHRONIZER SYSTEM

Filed May 15, 1961 6 Sheets-Sheet 1

INVENTOR.
BERT F. KRAUSS

DIGITAL SIGNAL SYNCHRONIZER SYSTEM

Filed May 15, 1961 6 Sheets-Sheet 2

*INVENTOR.*
BERT F. KRAUSS

*BY*

ATTORNEY

July 21, 1964 B. F. KRAUSS 3,141,930

DIGITAL SIGNAL SYNCHRONIZER SYSTEM

Filed May 15, 1961 6 Sheets-Sheet 3

INVENTOR.
BERT F. KRAUSS

BY

ATTORNEY

*INVENTOR.*
BERT F. KRAUSS
*BY*

ATTORNEY

INVENTOR.
BERT F. KRAUSS

BY

ATTORNEY

DIGITAL SIGNAL SYNCHRONIZER SYSTEM

Filed May 15, 1961 6 Sheets-Sheet 6

INVENTOR.
BERT F. KRAUSS

BY

ATTORNEY 3,141,930
DIGITAL SIGNAL SYNCHRONIZER SYSTEM

Bert F. Krauss, Stamford, Conn., assignor to Stelma, Incorporated, Stamford, Conn., a corporation of Connecticut Filed May 15, 1961, Ser. No. 109,943
19 Claims. (Cl. 178—69.5)

This invention relates to a digital signal synchronizer system, and more particularly to a system for generating a digital output signal which is synchronized with an input signal. The system of this invention operates to continuously compare the input signal with the output signal, and to correct for any phase differences by controlling the system to advance or to retard the output signal until such output signal is synchronized in phase with the input signal. The invention is particularly useful in data processing systems or the like. As an embodiment of the invention, the circuitry employed herein to shift the output signal constitutes a null-seeking, digital servo loop.

In data processing systems it is often necessary to produce a digital signal which is, as closely as possible synchronized with another signal. For example, in synchronous telegraph systems, information is transmitted in a binary code wherein five adjacent bits define one character, and the next five adjacent bits define the next character. This transmitted information cannot be decoded correctly unless the timing circuits in the telegraph receiver are closely synchronized with the timing circuits in the telegraph transmitter. Since there are no synchronizing pulses in the transmitted signal, the telegraph receiver must contain means for synchronizing its internal or local timing signal with the incoming coded signal. Such synchronized internal timing signal then provides the timing signal for properly decoding the incoming coded signal.

In the prior art this synchronization was performed in a digital signal synchronizer which compared the incoming signal to the receiver local timing signal and subtracted pulses from the local timing signal if the incoming signal was late with respect to the local timing signal, or added pulses to the local timing signal if the incoming signal was early with respect to the local timing signal.

This invention utilizes, in part, a similar principle of adding or subtracting pulses in the generating of a timing pulse train, but it contains several features which make the system simpler, more accurate in operation, and more reliable in use, than the digital signal synchronizers heretofore known in the art.

In the prior art synchronizers a three-level comparison was made between the incoming signal and the local timing signal, i.e., the comparator was a three-state device which produced an "early," "late," or "in-phase," signal, identifying the time relation of the incoming signal relative to the local timing signals.

In accordance with this invention, however, it has been found that a two level comparison is not only adequate but also more accurate and simpler than a three-level comparison since, as accomplished herein, the comparison range is compressed.

Digital phase comparators operate by comparing the transition or vertical edges of digital signals, and two signals are almost never exactly in phase under an instantaneous comparison. Therefore when a prior art three level digital comparator says that two signals are "in phase" it is, strictly speaking, more often wrong than not. The "in-phase" signal can only indicate that both signal transitions fall within a time band or interval determined by the operating tolerance of the comparator circuit.

The false "in-phase" signal of the prior art was useful, however, in the sense that it de-sensitized the system against random out-of-phase conditions, and prevented the system from continuously adding pulses and subtracting pulses, in response to random phase variations which would themselves average out in time. But, such desensitizing required an operating tolerance in the comparator circuit.

However, as done herein, these random variations can be better averaged out in an integrator circuit, which is utilized for that purpose in this invention. Moreover, since digital signal synchronizers customarily include an integrator circuit it is possible to replace the three level comparator, of the prior art, with a two level comparator, as herein, without adding circuit elements or decreasing circuit accuracy.

The two level comparator of this invention provides the advantage of actually averaging out random variations by integration instead of relying on comparator circuit tolerance.

Another important advantage of this invention arises from the improved integrator circuit provided herein. In the prior art synchronizers, an integrator circuit was used to integrate the "early" and the "late" comparison signals over a predetermined length of time, and then was caused to actuate an addition or subtraction circuit when the integrated comparison signals exceeded a pre-determined threshold level.

In telegraph systems the required integration time was necessarily quite long, because the input signal frequency is low (around 75 c.p.s.), and because the input signal is subject to relatively slow random variations in the transmission link. Long time integrators are quite expensive to construct, however, because they require extra amplifiers and gating circuits that are provided to prevent overcorrection by removing an increment of charge from the integrating capacitor each time an addition or subtraction is made.

In accordance with this invention, however, the benefits of desired long time integration are produced by the combination of a fast time integrator and a separate correction circuit which samples the integrator condition at the desired long time interval. Since the "early" or "late" condition will be present at each signal transition until it is corrected or cancelled out, the fast time integrator will always give a valid indication of phase relation, and if the integrator is isolated from the correction circuit during the desired long time interval, the integrator will in effect perform the long time integration itself without necessitating a complex and expensive long time integration circuit. Furthermore, with a fast time integrator it is not necessary to remove increments of charge from the integrating capacitor when an addition or subtraction is made, because the short discharge time, as utilized herein, automatically rules out over-correction.

The combination of a short time integrator with an independent correction actuating circuit is a particularly important feature of this invention. The circuit is simplified as noted above, and great flexibility is provided in choosing the effective integration time for the synchronizer as a whole. In radio telegraphy, transmission conditions change quite radically from day to day, and even from hour to hour, and for most effective reception it is necessary to be able to adjust the synchronizer integration time to fit the transmission conditions. If the correction period is shorter than the random cyclical variations of the transmission link, the system will over-correct, and if the correction period is longer, the synchronizer will under-correct. Either case will result in incorrect decoding. Therefore it is highly desirable that the synchronizer integration time be controllable by the telegraph operator so that he can continuously adapt such integration time to the vagaries of the radio transmission link.

An important object of the invention is to provide a data signal processing system in which an operational output signal is time controlled to place it in phase synchronism with an input signal.

Another object of this invention is to obtain the benefits of long time integration of incoming signal time phase deviations as "early" or "late," with inexpensive fast time integration and adjustable selective correction time.

Another object of the invention is to provide a digital, signal system in which an input digital signal is utilized to control the local generation of an output signal with corresponding intelligence, and in which suitable means, for example, a null-seeking digital servo loop, is employed to establish phase synchronism between the digital input signal and the digital output signal.

Still another object of the invention, therefore, is to provide a digital signal synchronizing system in which the "early" or "late" arrival time deviations of a train of input digital signals relative to a train of local timing signals, are algebraically integrated immediately upon occurrence in a short time integrator, which is then periodically sampled at longer time intervals that are adjustably variable at the will of a supervisor.

Other important objects, features and advantages of this invention relate to the provision of improved correction circuits, threshold circuits, correction actuating circuits, comparator circuits, and gating circuits thereof. These advantages will become apparent to those skilled in the art from the following description of one illustrative embodiment of the invention, in connection with the attached drawings, in which.

Figure 3:
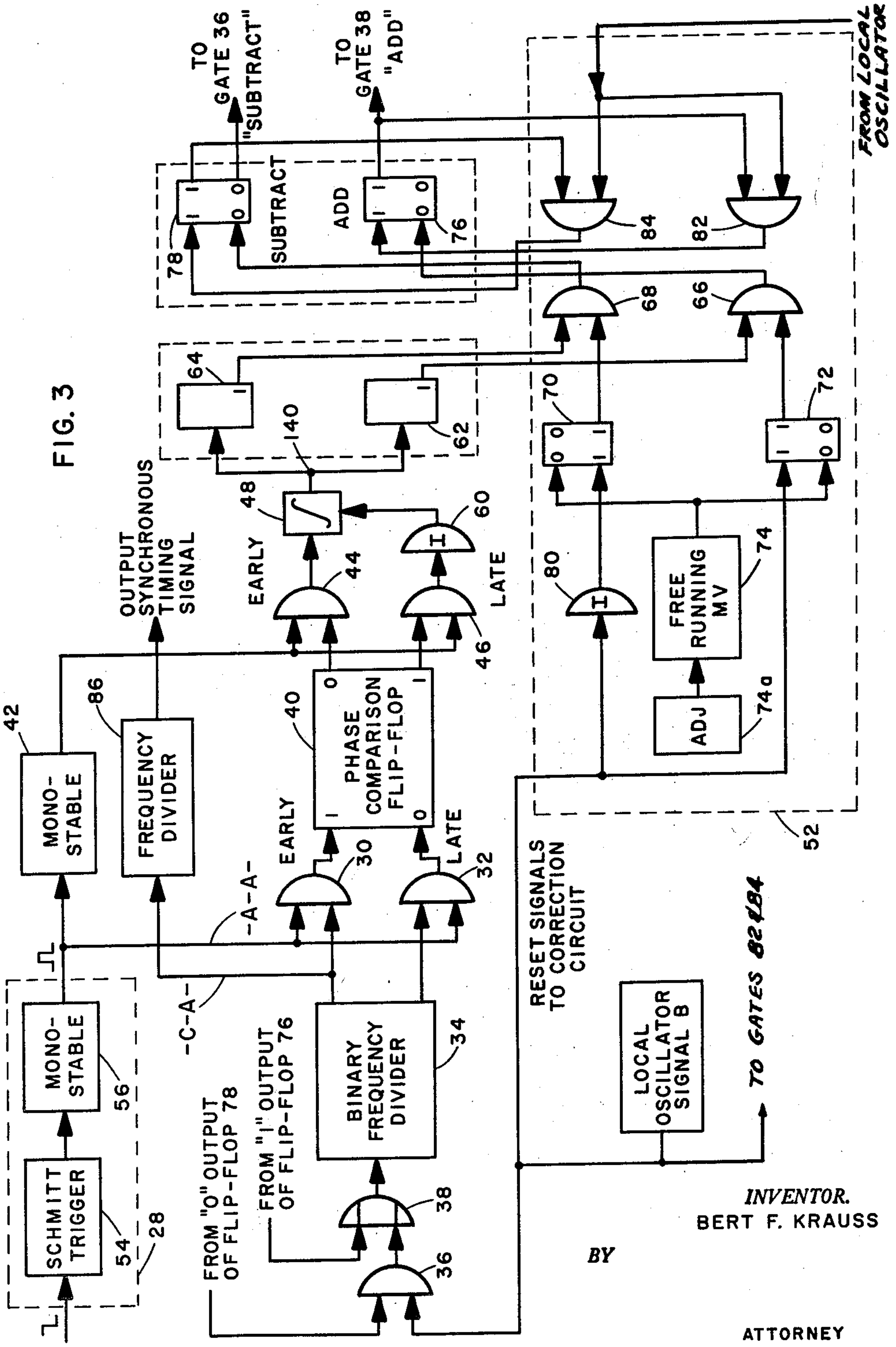
FIG. 3 is a more detailed block diagram of the embodiment shown in FIG. 2.
Figure 6:
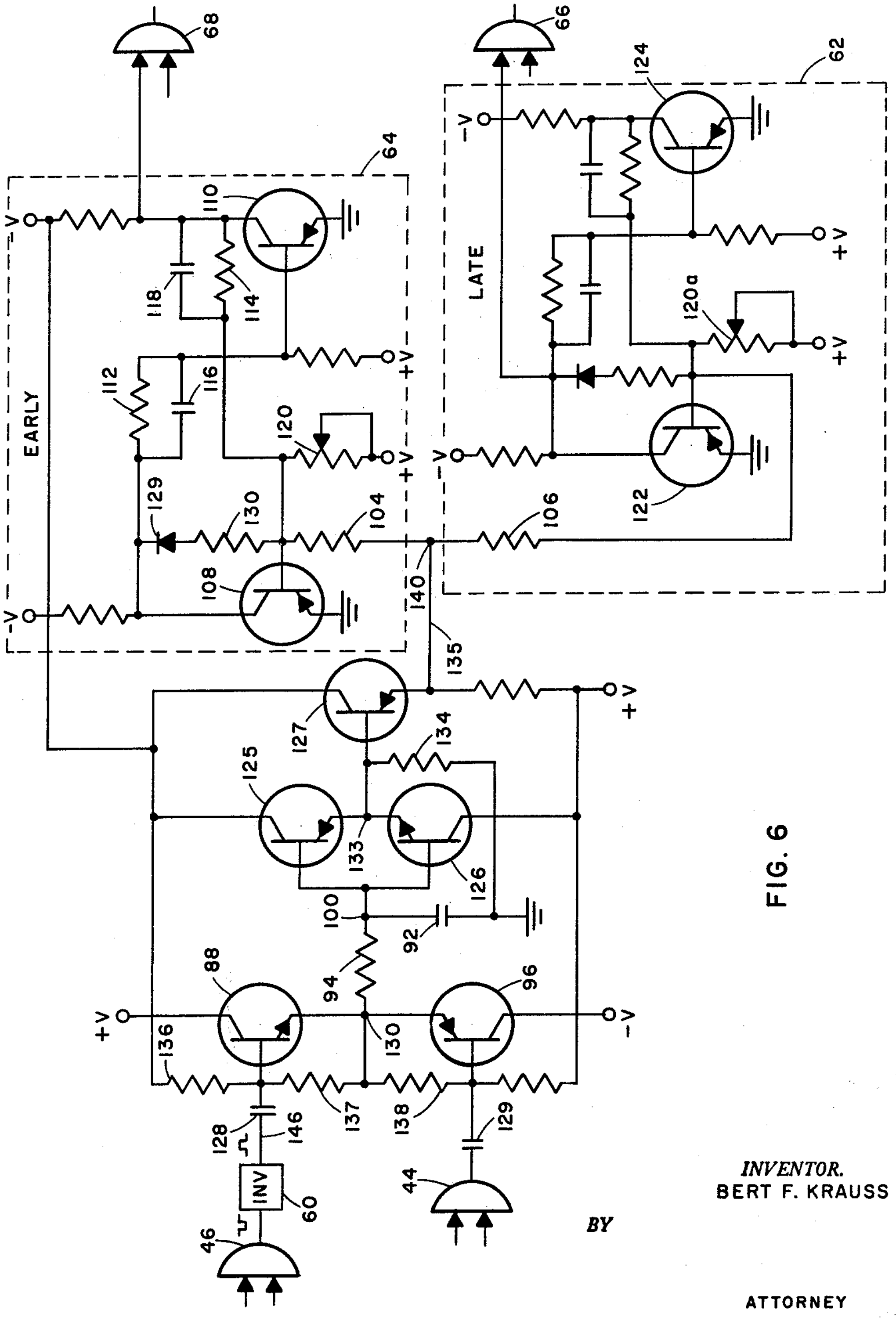

FIG. 6 is a diagram that shows a suitable circuit arrangement for the integrator 48, the flip-flop 62, and the flip-flop 64 of FIG. 3;

FIGS. 7–A and 7–B show schematically the operations of the flip-flops herein; and FIGS. 8–A and 8–B show the inverting operations of the gates of that type.

Figures 1, 7A, 7B, 8A, 8B:
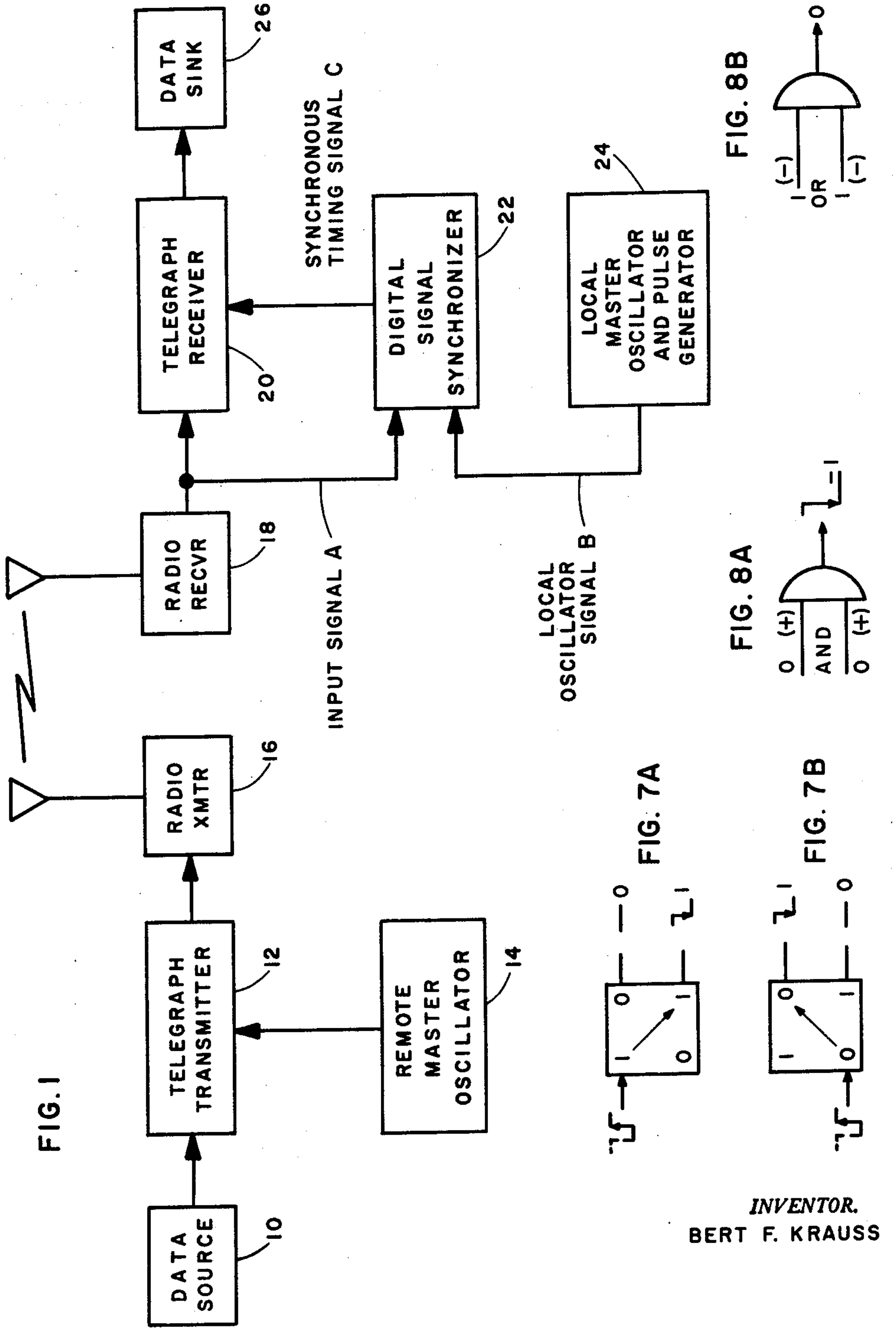
FIG. 1 shows a block diagram of a synchronous radio telegraph system to show the application of a digital signal synchronizer of the type provided in this invention.

FIG. 1 shows a synchronous radio telegraph system employing a digital signal synchronizer of the type contemplated and provided by this invention for use with the receiver of the telegraph system. At this transmitting end of the system a data source 10 modulates a telegraph transmitter 12 to produce a digital code output signal in which one group of five successive binary bits defines one character, and the next group of five successive bits defines the next character. The bit timing of the transmitted coded signal is controlled by a remote master oscillator 14 at the transmitter.

The digital code output of the telegraph transmitter 12 is transformed into a radio-freqency signal in a radio transmitter 16 and the signal is transmitted to a radio receiver 18, which detects the radio-frequency signal and converts it back into a coded digital code. This coded input signal which is called the input signal –A– herein, is supplied to a telegraph receiver 20, for decoding. The input signal –A– is also supplied to a digital signal synchronizer 22, to develop a local synchronized output timing signal –C–A–. The synchronizer 22 also receives a local oscillator signal –B– from a local master oscillator 24. The digital signal synchronizer 22 operates, in accordance with this invention, to produce the synchronous output timing signal –C–A–, which is then used in the telegraph receiver 20 to aid in decoding the input signal –A–. The decoded input signal is then applied to a load or data sink 26, which may be a teleprinter or the like.

Figure 2:
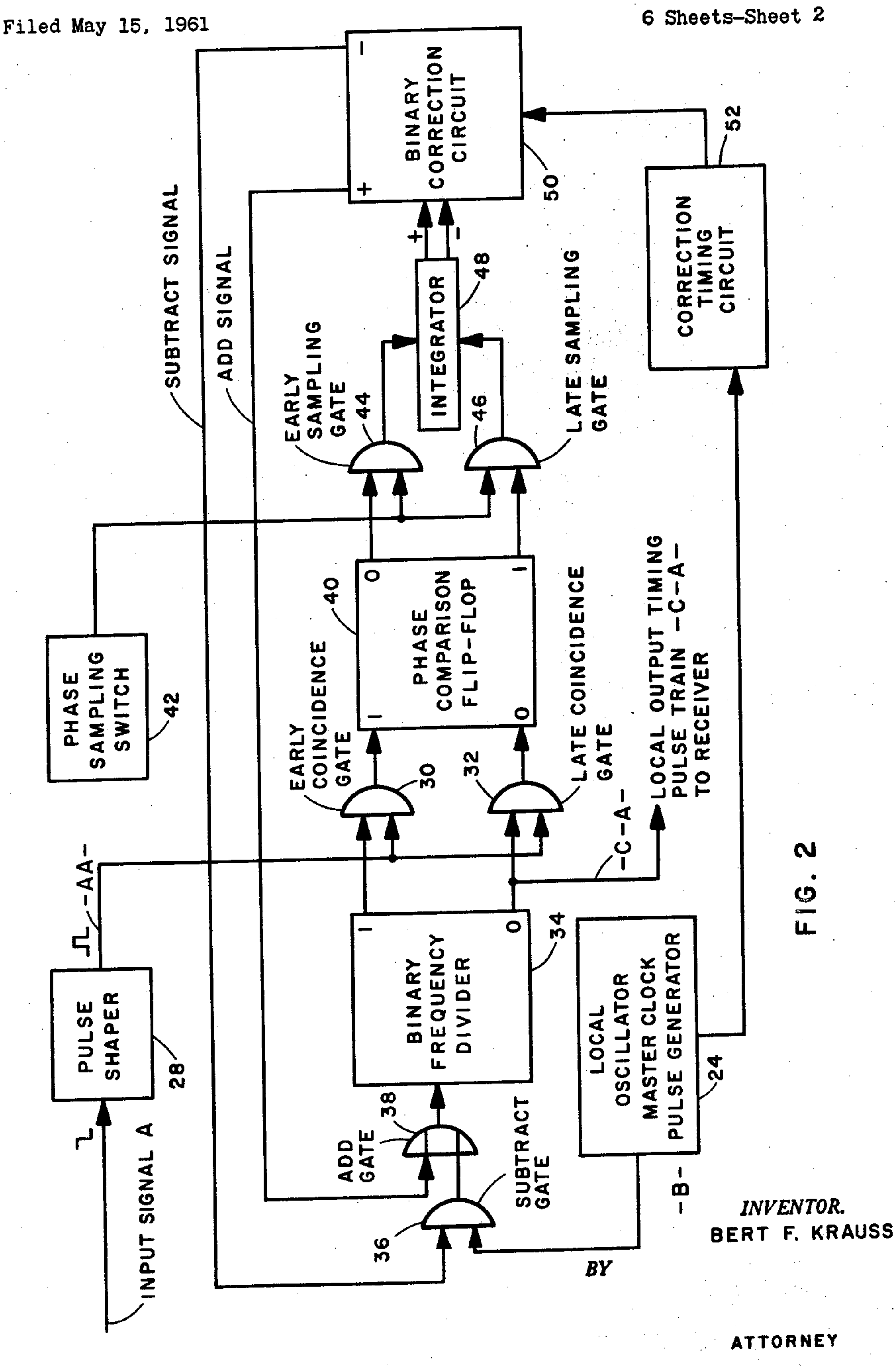
FIG. 2 is a general block diagram of one embodiment of the digital signal synchronizer of this invention.

FIG. 2 shows an embodiment of this invention which is adapted for use in a synchronous radio telegraph system as described above, and this embodiment will be used as an example in this disclosure. It should be understood, however, that the utility of this invention is by no means limited to telegraph systems. The invention can be adapted to function in any system where a first digital signal, which may be an incoming signal, is to be synchronized with a second digital signal, which may be the output signal.

FIG. 2 shows one embodiment of the invention which is adapted to receive the telegraph input signal –A– and to compare it with a signal derived, and, in this case, subdivided, from a local oscillator signal to generate a synchronous output timing signal –C–A–. In telegraphy it is customary to use a high-frequency master oscillator as a clock for generating a train of timing signals, and to divide the train frequency down to the desired local timing frequency. This embodiment of the invention also operates to divide the frequency of the local oscillator signal –B– down to approximately the input signal frequency for comparison, and then operates in accordance with this invention to produce a synchronous output timing signal –C–A– which is locked in phase to the input signal –A–.

The invention operates, generally, by comparing the transitions of input signal –A– to the transitions of the local timing frequency, corresponding to the divided local oscillator signal, and in then correcting for any difference of phase by adding input pulses, from the clock to the frequency divider, when input signal –A– is late, or by subtracting input pulses from the regular pulse train to the frequency divider when input signal –A– is early. The pulses are added or subtracted at the high frequency side of the frequency dividing circuits, which gives a phase correction of $360°/N$ for each such pulse, where N is the scale or stepdown ratio of the frequency divider. In this particular embodiment the step-down ratio is approximately 1,000, and the phase correction sensitivity is accordingly 360°/1000 or 0.36 degree of phase angle. It will be apparent, however, that any desired degree of phase correction sensitivity could be obtained by simply increasing or decreasing the scale of the frequency divider to the appropriate level.

Figure 4:
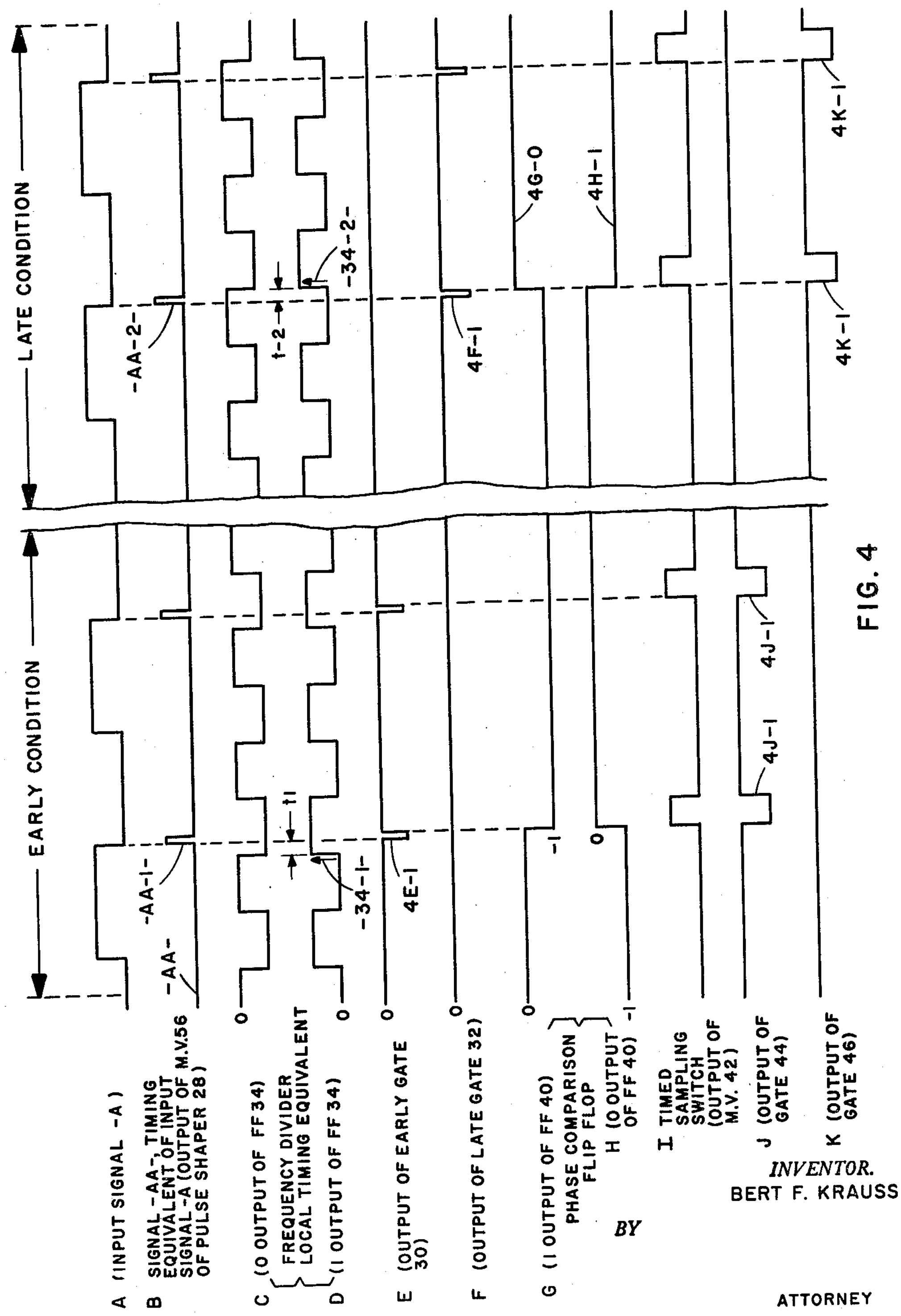
FIG. 4 is a set of waveforms illustrating the phase comparison process in the embodiment of FIGS. 2 and 3.

Proceeding with FIGURE 2, the input signal –A– is supplied to a pulse shaper 28, which produces a short or narrow reference pulse –AA– for each negative-going transition of input signal –A– as shown in lines A and B of FIG. 4.

The narrow shaped reference pulse –AA– essentially represents a time phase indication definitely time-related to the input signal –A–. This input reference pulse –AA– is then compared with a locally generated reference time signal –C–A–, defined later, to ascertain the time phase relation between input reference –AA– and local reference –C–A– in order to shift local reference signal –C–A– to a substantially synchronized relationship with input reference –AA– to within a limited time phase interval representing the tolerance of the system.

The local timing signal –C–A– is generated as a timing signal pulse train whose pulses may be shifted to establish the necessary synchronization with signal –AA–. To generate the local timing signal –C–A–, a master clock pulse generator is suitably controlled by the local master oscillator 24, of fixed frequency, to generate an output signal pulse train –B– of regularly timed pulses. These pulses –B– are fed to a binary frequency divider 34 and are divided down to an output pulse train of lesser frequency that would normally be a regular fraction of the clock frequency. Two frequency control gates 36 and 38 are shown whose functions will be described later, for controlling such output frequency.

However, in order to shift the train of output signal pulses –C–A–, from the frequency divider, one or more pulses may and will be subtracted from, or added to, the regular pulse train –B– as that train –B– would normally be fed from the oscillator pulse generator 24 to the frequency divider 34.

The input reference signal –AA– from pulse shaper 28 is applied in parallel to two AND gates 30 and 32, which also, respectively, receive the separate complementary outputs from the last binary circuit in the binary frequency divider 34. The oscillator signal train –B– is applied to the input of the binary frequency divider 34 through an AND gate 36 and an OR gate 38, which are respectively used for subtracting or for adding pulses from or to the input to the binary frequency divider 34, as will be explained later.

The controlled output from the binary frequency divider 34 represents the desired controlled local output timing pulse train –C–A–.

If the –1– output of frequency divider 34, as a timing pulse train, is early with respect to input signal –A–, the "early" gate 30 will be enabled and a phase comparison flip-flop 40 will be set to its "early" state.

This "early" relation is shown by lines B and D of FIGURE 4, at the left-hand side of the figure. An –AA– pulse identified as –AA–1– and shown in line B, is generated by pulse shaper 28 at a negative-going excursion of signal –A– in line A. In line D, the binary –1– output terminal of the final flip-flop or binary of frequency divider 34 is at its logical –1– value and is "early" relative to pulse –AA–1– by the interval shown as –*t*–1–, between the locus of positive going excursion to –1– indicated by the arrow 34–1– and the locus of the dotted line representing the positive going edge –AA–1– of the –AA– pulse in line B. Both pulses, –AA–1– and 34–1, are of the same polarity and will operate gate 30, which is an inverting AND gate, of the type in FIGURE 8–B, to develop a negative (—) output pulse to set the phase comparison flip-flop 40 to its –1– or "early" state. Gate 30 is therefore designated the "early coincidence gate."

If, on the other hand, the –1– output of frequency divider 34 is late with respect to input signal –A–, the late gate 32 will be enabled and the phase-comparison flip-flop 40 will be set to its "late" state.

This "late" relation is shown by lines B and C of FIGURE 4, at the right-hand side of the figure. Pulse –AA–2– shown in line B is generated, as was –AA–1, by a negative-going excursion of signal –A– in line A. In line C, the binary –1– output from the final flip-flop or binary of the frequency divider 34 is at its –0– logical value and its –1– going excursion, shown as –34–2– in line D, is late relative to pulse –AA–2– by the interval shown as –*t*–2–, between the locus of the positive-going excursion to –1– indicated by arrow –34–2– and the locus of the dotted line representing the positive-going edge of a signal pulse –AA–2– in line B. At this interval –*t*–2–, pulse –AA–2– is positive and –1– output of divider 34 is negative. Therefore "early" gate 30 does not operate. Hoever, the –0– output of divider 34 is now positive as shown in line C of FIGURE 4. Therefore, gate 32 operates, and, being an inverting AND gate, as in FIGURE 8–B, gate 32 delivers a negative (—) pulse to the –0– input to reset phase-comparison flip-flop 40 to its –0–, or "late," state. Gate 32 is therefore designated the "late coincidence gate."

Thus the flip-flop 40 makes a comparison between input signal –AA– and the local timing pulse train –C–A– at each negative-going transition of input signal –AA– to ascertain the "early" or the "late" condition, as shown in FIGURE 4.

The state of the phase-comparison flip-flop 40 is, in turn, sampled periodically by a pulse phase-sampling switch 42, which enables two phase-sampling gates 44 and 46 and applies an "early" signal to an integrator 48 if phase-comparison flip-flop 40 is in the "early" state, or applies a "late" signal to the integrator 48 if phase-comparison flip-flop 40 is in the "late" state. The phase-sampling switch 42 is preferably opened once for each negative-going transition of input signal –A–, marked by an –AA– pulse in line B, FIGURE 4, but the switch 42 does not necessarily have to be in phase with input signal –A–.

The integrator 48 integrates both the "early" signals and the "late" signals which it receives through the phase-sampling gates 44 and 46, and subtracts one integration from the other to produce a net output signal that indicates at any given time, whether the late signals have predominated over the early signals or vice versa during the integrating interval. In passing, it is here noted again that the integrator 48 is a fast operating circuit and component, to provide one of the important features of this invention, and will be described in more detail below.

The condition of integrator 48 is sampled periodically to derive a corresponding polarity signal which is then supplied to a binary correction circuit 50, which is actuated periodically, by a regular correction timing circuit 52, to add pulses through the OR gate 38 or to subtract pulses through the AND gate 36, previously referred to, at the input to the binary frequency divider 34, in accordance with the net output signal derived as representative of the condition of integrator 48. The correction circuit 50 operates either to add a pulse, or to subtract a pulse, or to do nothing, relative to the –B– signal train input to the frequency divider 34, when actuated by the timing circuit 52.

The binary correction circuit 50 serves as the source of extra pulses for adding the extra pulses to the input of the frequency divider 34, beyond what is available from the local oscillator pulse generator 24. The subtraction operation is accomplished by removing a pulse from the regular pulse train from that local oscillator pulse generator 24.

FIGURE 3 shows a more detailed block diagram of the above described embodiment of FIGURE 2. In FIGURE 3, the pulse shaper 28 of FIG. 2 is more fully shown to comprise a Schmitt Trigger 54 and a monostable multivibrator 56; the pulse phase-sampling switch 42 of FIG. 2 is shown to comprise a monostable multivibrator; the binary correction circuit 50 of FIG. 2 is shown to comprise four flip-flops 62, 64, 76 and 78; and the correction timing circuit 52 of FIG. 2 is shown to comprise an inverter 80, a free-running multivibrator 74, two flip-flops 70 and 72, and four AND gates 66, 68, 82 and 84. Flip-flops 62 and 64 are threshold controlled by the value of the integrator net signal. Flip-flops 70 and 72 are regular timing controls for isolating gates 66 and 68 that set flip-flops 76 and 78 to store a signal to control "early" or "late" gates 36 and 38 at input to frequency divider 34.

Figure 5:
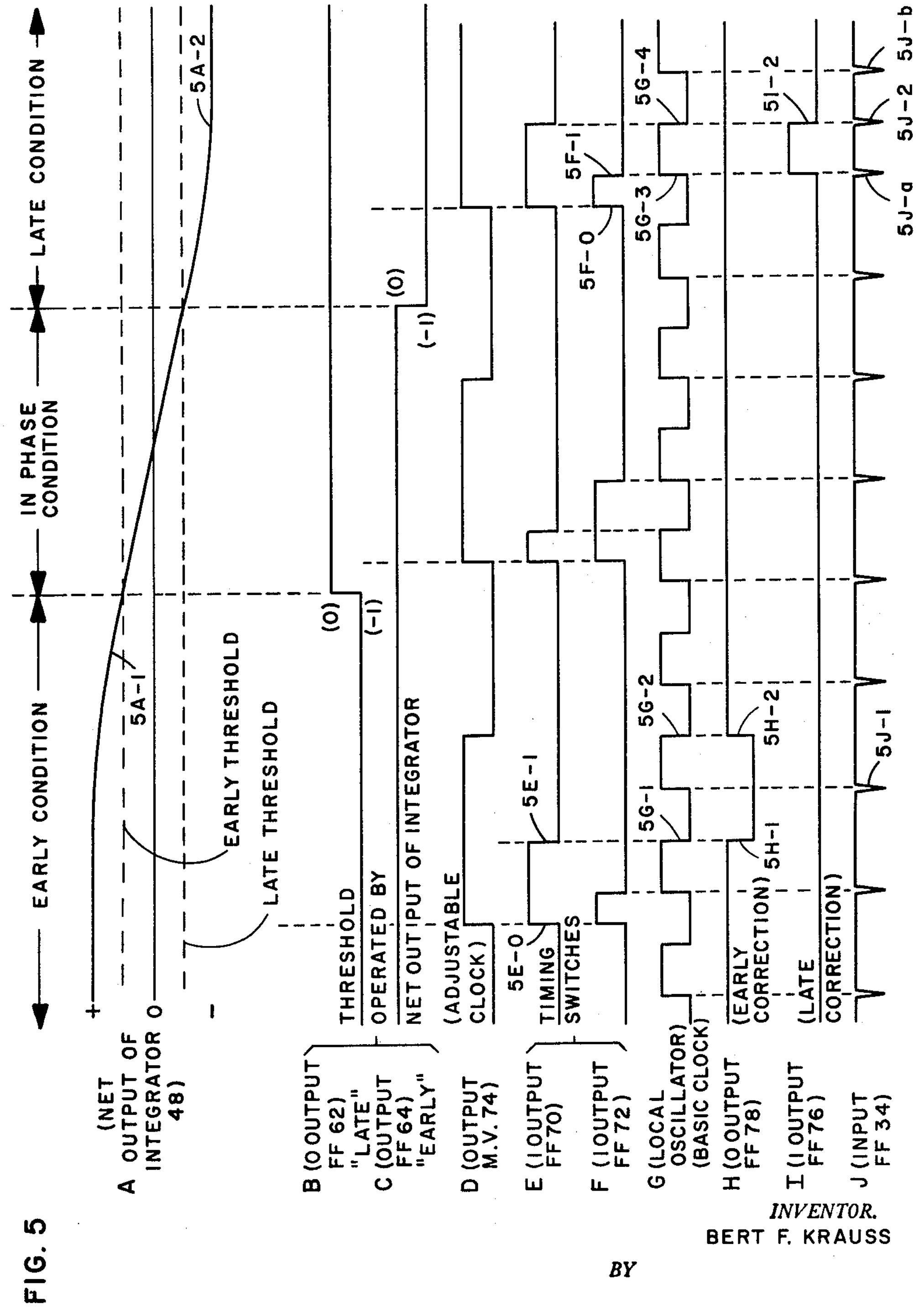
FIG. 5 is a set of waveforms illustrating the phase correction process in the embodiment of FIGS. 2 and 3.

FIG. 4 shows a set of waveforms illustrating the phase comparison process in this particular circuit arrangement, and FIG. 5 shows a set of waveforms illustrating the phase correction process, to aid in describing the operation in FIG. 3.

Before going into detail on FIGS. 3, 4 and 5, it will be well, however, to first define the logical symols used herein. Unless otherwise noted, the flip-flops 70, 72, 76 and 78, shown in FIG. 3, are A.C. coupled flip-flops which respond to a positive-going excursion of a pulse on either the –1– or the –0– input terminal, both input terminals being shown on the left hand side of the flip-flop block, as shown in FIG. 7–A and FIG. 7–B. When triggered at the –1– input terminal the flip-flop assumes an "on" state, with a logical –1– output signal appearing on the binary –1– output terminal and a logical –0– output signal appearing on the binary –0– output terminal. When triggered on the –0– input terminal the flip-flop assumes an "off" state, which puts a logical –0– output signal on the binary –1– output terminal and a logical –1– output signal on the binary –0– output terminal.

In this particular embodiment a logical –1– output signal is represented by a negative voltage and a logical –0– output signal is represented by ground. The binary designation indicates the specific terminal for identification. The logical designation indicates the signal level.

All of the AND gates 30, 32, 36, 66, 68, 82 and 84, shown in FIG. 3, are inverting AND gates, or NOR gates, which produce a logical –1– output signal when both inputs are logical –0–'s and a logical –0– output when either input signal is a logical –1–, as shown in FIG. 8–A and FIG. 8–B.

When a NOR gate, as in FIGS. 8–A and 8–B, feeds to either input terminal of a flip-flop it should be noted that the flip-flop does not trigger when the gate is turned on, since this produces a negative excursion in the gate output, but rather that the flip-flop triggers when the gate turns off, because this produces a positive excursion as the gate output switches from a logical –1– (–) to a logical –0– (+), as may be appreciated from FIGS. 7–A and 7–B.

With the above noted definitions in mind, the operation of this embodiment will be described starting with input signal –A–. Referring to FIG. 3, for the circuit, and to FIG. 4 for the wave forms, input signal –A– (waveform 4A) is applied to the Schmitt Trigger 54 which sharpens the transitions of the input signal and provides an output trigger signal which is constant in amplitude over wide variations of amplitude of input signal –A–. The output of Schmitt Trigger 54 triggers the monostable multivibrator 56, to produce a narrow, positive-going output pulse –AA– (waveform 4B) for each negative-going transition of input signal –A–. Two pulses –AA–1– and –AA–2– are separately identified in FIG. 4 for explanatory purposes later. The output of multivibrator 56 is applied in parallel to two AND gates 30 and 32, which also receive complementary output signals from the frequency divider 34.

The frequency divider 34 is driven by the local oscillator signal –B– through gates 36 and 38, which control the addition, or subtraction, of input clock pulses, to, or from the frequency divider 34, as will be described later. The frequency divider 34 produces two complementary output square waves (waveforms 4C and 4D) at twice the approximate frequency of the input signal –A–. Since one of these complementary outputs is the output reference timing signal –C–A– already mentioned, that timing signal when properly synchronized will be double the desired frequency, and will therefore be halved.

For the purposes of this description the frequency of input signal –A– will be defined as the frequency of a square wave formed by alternating mark-space inputs. According to this definition, the frequency of input signal –A– is equal to one-half the baud rate of the telegraph code.

In this particular embodiment it is important that the output frequency of frequency divider 34 be twice that of the input signal, because the input signal is not a periodic square wave but rather a modulated wave which sometimes stays high for two or more bit times. Suppose, for example, that the output of binary frequency divider 34 was equal in frequency to input signal –A– and that it happened to be early with respect thereto, that is signal –A– was late. As long as input signal –A– alternated between its –0– and –1– state at every bit transition the circuit would operate properly, i.e., it would establish coincidence at "early" gate 30 with each negative going transition of the input signal. But if the input signal stayed in the –1– or –0– state for two bit times, the negative going transition of the input signal would be displaced by 180° with respect to the output signal of binary frequency divider 34, and coincidence would be established at "late" coincidence gate 32 even though the "early" condition still prevailed. To avoid false indications of this type it is necessary to double the frequency of the frequency divider output so that an absolute displacement of 180° in the input signal transition will result in a relative shift of 360° at the comparison gates. This arrangement makes the "early" and "late" signals true under all input signal conditions. The same result can be obtained with any frequency which is an even multiple of the input signal frequency, but in this embodiment of the invention it is preferable to stay as close as possible to the input frequency. The halving of the derived signal –C–A– just previously explained, provides the correct local timing signal for the operation of load apparatus.

The desired approximate output frequency of the binary frequency divider 34 can be set in any number of ways, but in this particular embodiment it is set by tuning the local master oscillator 24 to a frequency equal to N times the bit rate of signal –A–, where N is the scale of frequency divider 34. Since the input baud rate is known in advance, there is no need to provide for frequency adjustments in this embodiment of the invention. It might, however, be necessary to use a variable local oscillator or variable frequency divider in other applications of the invention, and in that case any suitable frequency control means could be used to bring the frequency divider output to approximately twice the input signal frequency, or if appropriate, a multiple of twice the input signal or frequency.

The input signals to "early" coincidence gate 30 and to "late" coincidence gate 32 are shown in waveform B, C, and D of FIG. 4, in the regions under the headings "EARLY CONDITION" and "LATE CONDITION." Waveform B represents the shaped pulse signal –AA– output from monostable multivibrator 56, of pulse shaper 28, and waveforms C and D represent complementary outputs of logical –0– and logical –1– from frequency divider 34.

If the output of frequency divider 34 is early with respect to the input signal –A–, gate 30 will be enabled (waveform 4E) and phase comparison flip-flop 40 will be triggered to its "on" or "early" state (waveforms 4G and 4H). Early gate 30 will be thus enabled by positive pulse –AA–1– from monostable multivibrator 56, line 4B, and positive condition –1– from frequency divider 34, line 4D. Early gate 30 acts as an inverter to feed a negative trigger pulse 4E–1, line 4E, to phase-comparison flip-flop 40. If, on the other hand, the output of frequency divider 34 is late with respect to input signal –A–, gate 32 will be enabled (waveform 4F) by the positive pulse –AA–2– in line 4B and the positive status output –0– from frequency divider 34, line 4C, and flip-flop 40 will be triggered by a pulse 4F–1 to its "off" or "late" state (waveform 4G and 4H), 4G–0 and 4H–1.

The "early" and the "late" relationship will be better understood now, upon referring to lines A, B, C and D, in FIG. 4.

Line A, FIG. 4, represents the incoming signal –A–, shown in regular even form for illustration. A complete bit of information will include, for this example, one positive mark and one space.

Line B, FIG. 4, represents the output of the pulse shaper 28, a narrow positive pulse generated on each negative-going transition of incoming signal –A–. For identification this shaped pulse signal is –AA–, with a numeral for a specific pulse.

Line C, FIG. 4, represents the logical polarity output from the binary –0– output terminal of the final binary or flip-flop in the frequency divider 34.

Line D represents the complement of line C, that is, the logical signal value output from the –1– output terminal, which is the complement or inverse of the logical value generated at the –0– output terminal. Thus, under normal conditions, lines C and D represent two regular pulse trains of opposite or complementary polarities or logical values, and the pulse train from –1– output terminal of frequency divider 34 represents the local output timing signal –C–A–, modified as necessary, to synchronize with incoming signal –A–.

As previously mentioned, the output pulse frequency from frequency divider 34 is double the frequency of incoming signal –A–.

Therefore, the pulse repetition rate, or local output reference frequency, in lines C and D, FIG. 4, is double the incoming signal frequency in line A. After modification and correction, that output pulse frequency will be halved for the true synchronous timing signal for the receiver, as already explained.

Since the negative-going excursion of signal –A– is utilized to determine its equivalent time position, the corresponding middle positive-going excursion of the –1– output of frequency divider 34 is utilized for time phase comparison to ascertain the "early" or "late" condition of the reference local timing signal, which is the local reference frequency.

As may be seen in FIG. 4, line D, the positive-going excursion, shown by arrow –34–1–, is about one-quarter cycle to the left, or ahead, or "early," relative to pulse –AA–1–, representing the time of the negative-going excursion of incoming signal –A– in line A. The distance –t–1– represents the time phase difference or "early" condition.

It will be noted that the output in line D is in the logical –1– or high, or indicated positive, condition at this time. The shaped time pulse in line B is always positive. Therefore, these two pulses, line B and line D, are both positive into AND gate 30, and produce a negative output pulse from gate 30 to the input –1– terminal of phase comparison flip-flop 40, FIG. 3, as shown by pulse 4E–1 in FIG. 4, line E.

At this time the logical –0– output from binary frequency divider 34 is negative, as in line C, FIG. 4. Therefore gate 32 does not operate, as is shown in FIG. 4, line F.

If, however the local timing signal output from binary frequency divider 34 were "late," relative to incoming signal –A–, the condition as shown at the right hand side of FIG. 4 would exit. The positive pulse –AA–2– in line B would occur while the –0– output from the binary frequency divider 34, line C, was positive and the –1– output negative. Then, as seen in FIG. 3, "late" gate 32 would open as in FIG. 4, line F, to put a negative pulse 4F–1 on –0– input of phase-comparison flip-flop 40, while gate 30 would stay closed.

Thus phase comparison flip-flop 40 is set or reset according to each condition of "early" or "late," of the –1– output from frequency divider 34, FIG. 4, line 4D, as signal –C–A– relative to the equivalent input signal –AA–, line 4B, FIG. 4. If either such condition continues for two or more successive time intervals, the state of the flip-flop 40 remains unchanged ubntil the condition of frequency divider 34 is changed, to correct such time or phase difference between –C–A– and –AA–.

Assuming the "early" condition, the AND gate 30 has put a negative pulse on input –1– terminal of phase-comparison flip-flop 40. The negative-going excursion has no effect, but the positive-going return excusion, FIG. 4, line E, puts positive on –1– input of flip-flop 40, which puts phase-comparison flip-flop 40 in the state with its –1– binary output in logical –1– (negative 1) value, and its –0– output in logical –0– (positive) value, as in FIG. 4, lines G and H, respectively.

As will now be shown, the positive value from the –0– output of phase-comparison flip-flop 40 goes through "early" gate 44 to the integrator 48, FIG. 3.

The state of phase-comparison flip-flop 40 is sampled at each negative-going transition of input signal –A– by the monostable multivibrator 42, which produces a narrow, positive-going pulse (waveform 4I) that enables gates 44 and 46 simultaneously and passes either an "early" pulse 4J–1 (waveform 4J) through gate 44, or a "late" pulse 4K–1 (waveform 4K) through gate 46, to integrator 48, depending upon the state of phase-comparison flip-flop 40. The "early" and the "late" pulses which are equal in amplitude and pulse width are integrated in integrator 48, which produces a single analog output signal that varies above or below zero. When the integrator output signal is positive the "early" pulses predominate over the "late" pulses, and vice-versa. For proper operation of the integrator, the negative output pulses from "late" gate 46 are inverted to positive through inverter 60.

The analog output signal of integrator 48 is applied in parallel to two threshold flip-flops 62 and 64, which are D.C. flip-flops that respond to analog threshold voltage levels rather than transients, as will be illustrated below. Flip-flops 62 and 64 are both normally biased "off." Flip-flop 62 triggers in response to a negative voltage level while flip-flop 64 triggers in response to a positive voltage level. Each threshold flip-flop 62 and 64 preferably contains an adjustable input threshold gate circuit for setting the triggering level, and each flip-flop preferably returns to its "off" state whenever its input voltage level falls below the threshold triggering level. With this arrangement the equivalent of a three-valued output signal can be obtained from integrator 48 which has only two output polarities, because both threshold flip-flops 62 and 64 will be "off" in the analog voltage input range between the positive threshold level and the negative threshold level, FIGURE 5 (waveforms 5A, 5B, and 5C), and either threshold flip-flop 62 or 64 will be "on" only while its threshold input voltage level is exceeded.

The integration time of integrator 48 is preferably selected to be long with respect to the high frequency phase variations in the input signal, but to be short with respect to the low frequency phase variations. The exact integration time selected will, of course, depend upon specific environmental conditions, but this selection is well understood by those skilled in the art. The specific threshold levels for flip-flops 62 and 64 may be selectively adjusted for the specific environmental conditions and the output voltages chosen for integrator 48. The threshold levels are set so they will turn the threshold flip-flops 62 and 64 "on" when a correction is desired and leave them "off" when no correction is desired.

The two threshold flip-flops 62 and 64 serve as storage buffers, to hold a signal state that is representative of the condition of integrator 48.

This condition of integrator 48 is ultimately to control the input timing signals to the binary frequency divider 34 in order to shift the output timing signal pulse train –C–A– into relative synchronism with the input signal –A–.

Thus, the state of integrator 48 is stored in threshold flip-flop 62 or 64 only so long as such state continues. Periodically, two isolating and timing gates 66 and 68 are enabled to selectively transmit a pulse from either threshold and storage flip-flop 62 or 64 to a respectively associated correction storage and buffer flip-flop 76 or 78. Thus, the state of integrator 48 is transferred from polarity-detection threshold-responsive storage flip-flops 62 or 64 to their corresponding correction control flip-flops 76 or 78 by periodic isolating and timing gates 66 and 68.

From the correction storage and buffer control flip-flops 76 or 78, a correction signal is selectively forwarded to either frequency control gate 38 or 36, at the front or input end of the binary frequency divider 34. There, the input signal pulse train –B– from the local oscillator is controlled by suppressing or blocking out one selected pulse of the train –B– from entry to the frequency divider 34, if the regular output pulse train –C–A– from the frequency divider 34 is "early" relative to incoming signal –A–, to slow-down the frequency divider 34. On the other hand, if the regular output pulse train –C–A– is "late" relative to incoming signal –A–, the correction pulse storage and buffer flip-flop 76 serves as an independent source to supply and insert an extra pulse at a selected point between two successive regular timing pulses in the regular signal pulse train –B– from the oscillator to the input of the binary frequency divider 34, to speed-up the frequency divider 34. When either correction control flip-flop 78 or 76 is set, by a signal pulse from its associated threshold flip-flip 64 or 62, the set correction flip-flop 78 or 76 then enables an associated restoring gate 84 or 82, respectively, which transmits a reset pulse upon receipt of the next pulse of the regular timing pulse train –B– from the local oscillator. The reset pulse resets the correction control flip-flop 78 or 76, as the case may be, to be ready to receive the next integrator condition-indicating pulse from threshold flip-flop 64 or 62 when the isolating and timing gates 68 and 66 are next enabled.

The details of those operations may now be considered, in considering FIG. 3 and the timing wave form charts in FIG. 5, which will be identified as line 5A, or 5D, for example, to indicate FIGURE 5 and the pertinent line. In FIGURE 5, the curve of line 5A shows the possible locus of net energization value of the integrator, between maximum design tolerance representing "early" condition, the "early" threshold level to operate or set threshold flip-flop 64 as a switch, the range of approximate "in phase" condition between the "early" and the "late" threshold values, and the maximum design tolerance for "late" condition.

The outputs of threshold flip-flops 62 and 64 indicate the condition of the integrator 48, and are normally blocked by isolating and timing gates 66 and 68, which in turn, are normally disabled by negative –1– input signals from regular timing control flip-flops 70 and 72. These isolating gates 66 and 68 serve a very important function in this invention because they isolate the phase-comparison portion of the circuit from the phase-correction portion of the circuit. Until isolating gates 66 and 68 are enabled by their respective timing control flip-flips 70 and 72, the states of threshold flip-flops 62 and 64 have no effect on the correction circuits. And since isolating gates 66 and 68 can be enabled at any desired rate, independent of the input signal of the phase comparison circuits, this arrangement makes possible the independently adjustable correction interval which can be made arbitrarily long without requiring a corresponding long-time integrator circuit with its inherent complexities, as used in the prior art. This arrangement is one of the important features of this invention.

The isolating gates 66 and 68 are periodically enabled whenever their regular timing control flip-flops 70 and 72 are turned off by an adjustable free-running multivibrator 74 (waveform 5D), which is shown provided with an adjustment schematically indicated at 74–*a*.

If the "early" integral value prevails, as 5A–1 in FIG. 5, in integrator 48 when timing flip-flop 70 is turned "off" at 5E–0 (waveform 5E), isolating gate 68 will be enabled to put out a negative pulse which will be positive-going on its return excursion and will then trigger correction flip-flop 78 (waveform 5H) at 5H–1 when gate 68 is again disabled by timing control flip-flop 70. Flip-flop 70 is reset at 5E–1 by the next negative-going excursion 5G–1 of local oscillator train signal –B– (waveform 5G) as inverted to a positive pulse by an inverter 80. When "early" correction control flip-flop 78 is triggered at 5H–1, input frequency control gate 36 is disabled or closed, to prevent the transfer of a regular timing pulse from train –B– until flip-flop 78 is reset by the next negative-going excursion 5G–2 of local oscillator signal –B–, which disables an AND gate 84, enabled by triggering of flip-flop 78, and resets flip-flop 78, at 5H–2. The disabling gate control produced by flip-flop 78 on input frequency control gate 36 will suppress one input pulse at location 5J–1 and eliminate it from the input to binary frequency divider 34 (waveform 5J).

In this connection it should be noted that positive-going excursions of local oscillator signal –B– are inverted in gate 36 but not in gate 38, which latter is a diode OR gate that responds to negative-going signals. Binary frequency divider 34 responds to negative transients (waveform 5J) which correspond, due to inversion in gate 36, to positive-going excursions of local oscillator signal –B– (waveform 5G).

If the "late" integral, 5A–2 in FIG. 5, prevails when flip-flop 72 is turned "off," at 5F–0, isolating gate 66 will be enabled and that gate 66 will trigger flip-flop 76 (waveform 5I) when gate 66 is again disabled by flip-flop 72, which is reset at 5F–1 by the next positive-going excursion of local oscillator signal –B– (waveform 5G) at 5G–3, disabling gate 82 and triggering flip-flop 76. After flip-flop 76 is triggered and set, a positive gate pulse is applied to input frequency control diode OR gate 38, from which an extra negative signal pulse 5J–2 is inserted into the input timing pulse train supplied to the frequency divider 34 (waveform 5J) when flip-flop 76 is restored and is turned back "on," at 5I–2 by the next negative-going excursion 5G–4 of local oscillator signal –B–.

It should be noted that the "subtract" signal 5H–1 to 5H–2 from correction flip-flop 78 is arranged to straddle and suppress one input pulse 5J–1 that would otherwise enter binary frequency divider 34, and that the "add" signal 5J–2 is arranged so that its signal-developing edge falls between two regular input pulses 5J–*a* and 5J–*b* of signal –B– supplied to binary frequency divider 34.

This circuit arrangement, which places the "add" and "subtract" signals in appropriate positions is an important feature of this invention because it works identically for all speeds in its operating ranges.

The pulses which are added to, or subtracted from, the input to binary frequency divider 34, serve to shift the phase of its output signal –C–A– by $360°/N$, where N is the frequency step-down ratio in the frequency divider 34. As long as the integrator output exceeds its "early" or "late" threshold this correction will be made every time the isolating gates 66 and 68 are enabled, and each correction will bring the timing signal –C–A– closer to the input signal –A– by an increment of $360°/N$. When the phase difference drops within the tolerance range set by the integrator and threshold circuits, the correction process will cease because threshold gates 66 and 68 will be disabled by negative logical –1– signals from flip-flops 62 and 64 at less than threshold settings.

The frequency of the corrected output signal –C–A– from frequency divider 34, is then halved, as previously explained in a separate frequency divider 86 to produce a synchronous local timing signal –C– which is synchronized with input signal –A– both in frequnecy and in phase. This synchronous local timing signal –C– then provides a time index by which telegraph receiver 20 (FIG. 1) can accurately decode input signal –A– at the receiver.

FIG. 6 shows one suitable circuit arrangement for the integrator 48 and the threshold responsive flip-flops 62 and 64 of FIG. 3.

When a pulse appears on line 146, indicating a "late" condition, a positive excursion will be passed through capacitor 128 to the base of transistor 88. Transistors 88 and 96 are arranged to be normally back biased or non-conducting by voltage dividing resistors, 136, 137, 138 and 139. Assuming, then, that a pulse appears on line 146 indicating a late pulse, transistor 88 will start conducting, and its positive collector voltage will appear at junction 130.

This positive voltage will charge capacitor 92 through resistor 94, driving junction 100 positive. This positive voltage is applied also to the base of normally non-conducting transistors 125 and 126. Transistor 126 is an NPN transistor and will be biased into conduction by this positive voltage, but transistor 125 which is a PNP transistor will be unaffected by the positive voltage and will remain non-conducting. Conduction of transistor 126 applies its positive collector voltage to junction 133, and across resistor 134, and to the base of transistor 127. The positive collector voltage prevents transistor 127 from conducting, and thus the positive bias voltage on the emitter of transistor 127 will appear on line 135, to junction 140.

If a signal appears on line 144, indicating an "early" condition, a negative excursion is passed through condenser 129 to the base of transistor 96. Transistor 96 will conduct and its negative collector voltage is applied to the capacitor 92 through charging resistor 94. In this case junction 100 will be driven to a negative potential. This negative potential will have no effect on transistor 126 but will bias transistor 125 into conduction, causing the negative collector voltage to be coupled through resistor 134 to the base of transistor 127. Accordingly, 127 will now conduct, bringing its emitter to the same potential as the negative collector voltage. In this case a negative voltage will appear on line 135 to junction 140.

Thus, the potential on line 135 and at junction 140 will follow the potential of junction 100, representing the algebraically integrated charge on capacitor 92, which is the significant electronic component in the generalized integrator represented by block 48 in FIG. 3.

The charge on capacitor 92 indicates, by its polarity, whether the "early" pulses have predominated over the "late" pulses during the integration time, or vice-versa. The amplitude of the charge indicates the margin by which one has predominated over the other or in mathematical terms it indicates the difference between the integral of the "early" pulses and the integral of the "late" pulses over the integration time.

The charge of the integrating capacitor 92 is thus amplified in the non-inverted manner and is applied in parallel to the "early" and the "late" flip-flops 64 and 62 through input resistors 104 and 106. The "early" flip-flop 64 comprises PNP transistors 108 and 110, which are cross-coupled in the conventional manner through resistors 112 and 114 and commutating capacitors 116 and 118. Transistor 108 is normally biased on by a negative bias voltage applied through a variable resistor 120, which sets the trigger threshold level for the flip-flop. When the potential at junction 140 exceeds this threshold bias level, transistor 108 will cut off, and transistor 110 will conduct and develop a positive, or logical –0– output signal at the collector, for delivery to isolating gate 68. When the amplified value of charge from integrator 92 falls below the positive threshold level, transistor 108 will return to the conducting state, and a negative, or logical –1–, signal will be developed at the collector of transistor 110, and will act to inhibit isolating gate 68.

The "late" flip-flop 62, which comprises PNP transistors 122 and 124, operates in the same manner as the "early" flip-flop, but it triggers in response to a negative input signal which exceeds a positive bias threshold level.

Both flip-flops 62 and 64 are provided with an input load equalizing circuit comprising a rectifier and a resistor coupled in series with the input signal and in parallel with the base-collector path of the input transistor. Referring to the "early" flip-flop, this load equalizer comprises diode 129 and resistor 130, and functions as follows: When transistor 108 is conducting, diode 126 is back-biased and presents a high impedance path, but when transistor 108 cuts off, diode 129 conducts and presents a low impedance path which compensates for high base-collector impedance of transistor 108 in its non-conducting state. This input load equalization is important because it allows the "on" triggering threshold to be the same as the "off" triggering threshold. Without this input load equalization the flip-flop would trigger "on" at the desired threshold level, but it would not switch "off" when the input fell below the threshold level because the base potential of transistor 108 would have become less negative, and a lower input voltage level would be required to bring it into conduction again.

From the foregoing, description it will be apparent that this invention provides a digital frequency synchronizer which is simpler in structure, more accurate in operation, and more reliable in use than any heretofore known in the art. And it should be understood that this invention is by no means limited to the specific circuit structure herein disclosed, since many modifications may be made without departing from the basic teaching of this invention. For example, it is not necessary to operate the binary frequency divider 34 only at twice the input frequency; any even integral multiple will do. Also, other flip-flop circuits than those shown may be employed for mechanizing the binary correction circuit 50, or the correction actuating circuit 52, or the phase-sampling circuit 42. Any suitable circuit which performs the desired function can be used in place of those shown, as will be evident to those skilled in the art. In addition, any suitable integrating circuits may be used in place of the integrating circuit shown in FIG. 6. For example, separate integrating capacitors might be used to receive the "early" and the "late" input pulses, and their respective charges might be subtracted in a resistor subtraction circuit. These and many other modifications will be apparent to those skilled in the art, and the scope of the invention is intended to include all modifications falling within the scope of the claims.

What is claimed is:

1. A digital signal synchronizing system comprising: means to receive data pulse signals having a data bit frequency $(f)$: means for locally generating a master timing pulse signal train having a multiple frequency equal to N times $(f)$; means for comparing the time phase relationship between each data signal pulse and each successive Nth timing pulse to obtain a measure of time phase deviation of each data pulse from the corresponding Nth local timing pulse; means for algebraically adding such time phase deviations over a limited time interval to measure an average deviation or error for that interval; and means responsive to such measured average deviation for modifying the action of the master timing generating means to generate a phase-modified timing train signal so the Nth one of such phase modified timing signals will be shifted closer to the incoming data signal to provide an output timing signal synchronous with the incoming data signal.

2. A digital data transmission system comprising: means for receiving and sensing bits in an incoming train of bits of data and for generating corresponding identification bits; a local timing generator for generating a train of control timing signals; means for generating a train of output timing signals; means for receiving and for comparing the relative time relation between the identification bits and the output timing signals; means constituting a fast time response integrator for receiving data from the comparing means representative of the time relations discovered by said comparing means, said integrator serving thus to measure the average time discrepancy between incoming signal data bits and the output timing signals; means for adding to or subtracting from the control timing signals to shift the train of output timing signals; and means for controlling the rate of operation of said adding and subtracting means.

3. A digital data transmission system comprising: means for receiving and sensing bits in an incoming train of bits of data and for generating corresponding identification bits; a local timing generator for generating a train of control timing signals; means for generating a train of output timing signals; means for receiving and for comparing the relative time relation between the identification bits and the output timing signals; means constituting a fast time response integrator for receiving data from the comparing means representative of the time relations discovered by said comparing means, said integrator serving thus to measure the average time discrepancy between incoming signal data bits and the output timing signals; means for adjustably varying the effective output of the output timing generator to correct for such average discrepancy; and means for isolating said varying and correcting means from said integrator means to permit the output timing generator correction to be made effective over a relatively long time relative to the fast response time of the integrator, thereby permitting the use of a simple fast time integrator with relatively slow control at adjustably spaced relatively long intervals compared to the integration rate.

4. A digital signal synchronizer system, comprising: means to receive an incoming signal pulse train of operating frequency; means to generate an output signal pulse train at substantially same pulse frequency; means for comparing time-adjacent pulses of the incoming and of the output pulse train and rapidly algebraically adding and accumulating phase-time differences between such time-adjacent pulses over a selected time interval; and means responsive to a predetermined amount of accumulated differences for controlling the output generating means.

5. A digital signal synchronizer comprising: input means adapted to receive an input signal and to produce a digital reference signal corresponding in phase to said input signal; oscillator means operable to produce a local oscillator signal of substantially higher frequency than said input signal; a frequency divider adapted to receive said local oscillator signal and to produce an output signal which is substantially lower in frequency than said local oscillator signal; a first coincidence circuit responsive to said digital reference signal and to said output signal of said frequency divider, said first coincidence circuit being operable to produce an "early" signal when the phase of said frequency divider output signal leads the phase of said input signal; a second coincidence circuit responsive to said digital reference signal and to said output signal of said frequency divider, said second coincidence circuit being operable to produce a "late" signal when the phase of said frequency divider output signal lags the phase of said input signal; integrator means operable to integrate said "early" and said "late" signals; a binary correction circuit coupled to said integrator, said binary correction circuit being operable to produce a "subtract" signal when the integral of said "early" signals exceeds the integral of said "late" signals, and said binary correction circuit being operable to produce an "add" signal when the integral of said "late" signals exceeds the integral of said "early" signals; means responsive to said "add" signal to add an input signal to the input of said frequency divider; and means responsive to said "subtract" signal to subtract an input signal from the input of said frequency divider.

6. The combination defined in claim 5 wherein said frequency divider produces two complementary output signals, and wherein said first coincidence circuit is influenced according to said digital reference signal and according to one of said complementary output signals, and wherein said second coincidence circuit is influenced according to said digital reference signal and to the other of said complementary output signals.

7. The combination defined in claim 5, and also including a flip-flop coupled to said first and second coincidence circuits, said flip-flop being operable to assume an "early" state in response to an "early" signal from said first coincidence circuit and being operable to assume a "late" state in response to a "late" signal from said second coincidence circuit; sampling gate means coupled between outputs of said flip-flop and said integrator means, said sampling gate means being normally disabled; sampling switch means coupled to said sampling gate means, said sampling switch means being operable to periodically enable said sampling gate means; and means for periodically rendering said sampling switch means operable.

8. The combination defined in claim 5 wherein said means responsive to said "add" signal comprises an "add" circuit coupled between said binary correction circuit and said frequency divider, and wherein said means responsive to such "subtract" signal comprises a "subtract" circuit coupled between said oscillator means and said frequency divider.

9. The combination defined in claim 5 wherein said integrator means is operable to subtract the integral of said "early" signals from the integral of said "late" signals, and is operable to produce an analog output signal of one polarity when the integral of said "early" signals exceeds the integral of said "late" signals, and is operable to produce an analog output signal of the other polarity when the integral of said "late" signals exceed the integral of said "early" signals.

10. The combination defined in claim 5 and also including a correction actuating switch coupled to said binary correction circuit; and wherein said binary correction circuit is operable to produce a correction signal when actuated by said correction actuating switch; and wherein said correction actuating switch is operable to periodically actuate said correction circuit.

11. A digital signal synchronizer comprising: an input circuit adapted to receive an input signal and to produce a digital reference signal corresponding in phase to said input signal; oscillator means operable to produce a local oscillator signal of substantially higher frequency than said reference signal; a frequency divider adapted to receive said local oscillator signal and to produce two complementary output signals which are substantially lower in frequency than said local oscillator signal; a first coincidence circuit coupled to receive said digital reference signal and to receive one output signal of said frequency divider, said first coincidence circuit being operable to produce an "early" trigger signal when the phase of said one frequency divider output signal leads the phase of said input signal; a second coincidence circuit coupled to receive said digital reference signal and to receive the other output signal of said frequency divider, said second coincidence circuit being operable to produce a "late" trigger signal when the phase of said other frequency divider output signal lags the phase of said input signal; a flip-flop coupled to said first and second coincidence circuits, said flip-flop being operable to assume an "early" state in response to an "early" trigger signal from said first coincidence circuit and being operable to assume a "late" state in response to a "late" trigger signal from said second coincidence circuit; a first sampling gate coupled to one output terminal of said flip-flop and a second sampling gate coupled to the other output terminal of said flip-flop; a sampling switch coupled to said first and second sampling gates, said sampling switch being operable to periodically enable said first and second sampling gates; said first sampling gate being operable to produce an "early" output signal if said flip-flop is in its "early" state when said first sampling gate is enabled, and said second sampling gate being operable to produce a "late" output signal if said flip-flop is in its "late" state when said second sampling gate is enabled; integrator means coupled to said first and said second sampling gates, said integrator means being operable to integrate said "early" and said "late" output signals from said sampling gates and to subtract the integral of said "late" output signals from the integral of said "early" output signals, and said integrator means being operable to produce an analog output signal of one polarity when the integral of said "early" output signals exceeds the integral of said "late" output signals, and being operable to produce an analog output signal of the other polarity when the integral of said "late" output signals exceeds the integral of said "early" output signals; a binary correction circuit; means for coupling said binary correction circuit to said integrator means, said binary correction circuit having an "add" state and a "subtract" state and an "off" state, said binary correction circuit being operable to assume its "add" state when said analog output signal exceeds a first predetermined threshold level of one polarity, and being operable to assume its "subtract" state when said analog output signal exceeds a second pre-determined threshold level of the other polarity, and being operable to assume its "off" state when said analog output signal lies between said first and second threshold levels; a correction actuating switch coupled to said binary correction circuit, said correction actuating switch being operable to periodically actuate said binary correction circuit, and said binary correction circuit being operable when actuated in its "add" state to produce an "add" output signal and being operable when actuated in its "subtract" state to produce a "subtract" output signal; an "add" circuit coupled between said binary correction circuit and said frequency divider, said "add" circuit being responsive to said "add" signal to insert an extra signal input to said frequency divider; and a "subtract" circuit coupled between said oscillator means and said frequency divider, said "subtract" circuit being coupled to said binary correction circuit and being responsive to said "subtract" signal to delete an input signal normally supplied to said frequency divider by the local oscillator.

12. A digital signal synchronizer comprising: an input circuit adapted to receive an input signal and to produce digital reference pulses corresponding in phase with said input signal; oscillator means operable to produce a local oscillator signal substantially higher in frequency than said input signal; a frequency divider coupled to said local oscillator signal, said frequency divider being operable to produce two complementary squarewave output signals of approximately twice the frequency of said input signal; a first coincidence circuit having two input terminals and an output terminal, one input terminal being coupled to receive said digital reference signal and the other input terminal being coupled to receive one squarewave output of said frequency divider; a second coincidence circuit having two input terminals and an output terminal, one input treminal being coupled to receive said digital reference signal and the other input terminal being coupled to receive the other squarewave output of said frequency divider; a flip-flop having two input terminals and two output terminals, one input terminal being coupled to said output terminal of said first coincidence circuit and the other input terminal being coupled to said output terminal of said second coincidence circuit; a third coincidence circuit having two input terminals and an output terminal, one input terminal being coupled to one output terminal of said flip-flop; a fourth coincidence circuit having two input terminals and an output terminal, one input terminal being coupled to the other output terminal of said flip-flop; a sampling switch operable to produce a periodic gating pulse signal, said gating pulse signal being directed to the other input terminals of said third and fourth coincidence circuits; an integrator having two input terminals and an output terminal, one input terminal being coupled to said output terminal of said third coincidence circuit and the other input terminal being coupled to said output terminal of said fourth coincidence circuit, and said integrator being operable to produce an analog output signal proportional to the integral of one input signal minus the integral of the other input signal; second and third flip-flops each having one input terminal and one output terminal, each input terminal being coupled to receive said analog output signal of said integrator, said second flip-flop being responsive to said analog signal to assume one stable state when said analog signal is above a positive threshold level and to assume a second stable state when said analog signal is below said positive threshold level, and said third flip-flop being responsive to said analog signal to assume one stable state when said analog signal is below a negative threshold level and to assume a second stable state when said analog signal is above said negative threshold level; fifth and sixth coincidence circuits each having two input terminals and an output terminal, one input terminal of said fifth coincidence circuit being coupled to said output terminal of said second flip-flop and one input terminal of said sixth coincidence circuit being coupled to said output terminal of said third flip-flop; a correction actuating switch operable to produce a periodic actuating gate signal, said actuating gate signal being directed to the other input terminals of said fifth and sixth coincidence circuits; a "subtract" circuit having two input terminals and one output terminal, one input terminal being coupled to said output terminal of said fifth coincidence circuit and the other input terminal being coupled to receive said local oscillator signal, said "subtract" circuit being operable when actuated by a coincidence signal from said fifth coincidence circuit to produce a disabling gate on the output terminal thereof; and an "add" circuit having two input terminals and one output terminal, one input terminal being coupled to said output terminal of said sixth coincidence circuit and the other input terminal being coupled to receive said local oscillator signal, said "add" circuit being operable when actuated by a coincidence signal from said sixth coincidence circuit to produce an enabling gate on the output terminal thereof; a seventh coincidence circuit having two input terminals and an output terminal, one input terminal being coupled to said local oscillator signal and the other input terminal being coupled to said output terminal of said "subtract" circuit; and an OR circuit having two input terminals and an output terminal, one input terminal being coupled to said output terminal of said seventh coincidence circuit, the other input terminal being coupled to said output terminal of said "add" signal, and the output terminal being coupled to the input of said frequency divider.

13. The combination defined in claim 12 wherein said correction actuating switch comprises: a fourth and a fifth flip-flop each having two input terminals and an output terminal, the output terminal of said fourth flip-flop being coupled to the other input terminal of said fifth coincidence circuit, and the output terminal of said fifth flip-flop being coupled to the other input terminal of said sixth coincidence circuit; a multivibrator having an output signal coupled to one input terminal of said fourth and fifth flip-flops; the other input terminal of said fifth flip-flop being coupled to receive said local oscillator signal; and the other input terminal of said fourth flip-flop being coupled through an inverter to receive said local oscillator signal.

14. The combination defined in claim 13 wherein said "subtract" circuit comprises: a sixth flip-flop having two input terminals and two output terminals, one input terminal being coupled to said output terminal of said fifth coincidence circuit, one output terminal being coupled to said other input terminal of said seventh coincidence circuit; an eighth coincidence circuit having two input terminals and an output terminal, one input terminal being coupled to said local oscillator signal, the other input terminal being coupled to the other output terminal of said sixth flip-flop, and the output terminal being coupled to the other input terminal of said sixth flip-flop.

15. The combination defined in claim 14 wherein said "add" circuit comprises: a seventh flip-flop having two input terminals and an output terminal, one input terminal being coupled to said output terminal of said sixth coincidence circuit and the output terminal being coupled to said other input terminal of said OR circuit; a ninth coincidence circuit having two input terminals and an output terminal, one input terminal being coupled to said output terminal of said seventh flip-flop, the other input terminal being coupled to said local oscillator signal, and the output terminal being coupled to the other input terminal of said seventh flip-flop.

16. The combination defined in claim 15 wherein said integrator comprises an integrating capacitor coupled at one terminal to a reference potential and coupled at the other terminal of said third coincidence circuit and through an inverter to the output terminal of said fourth coincidence circuit.

17. A digital signal synchronizing means comprising means for receiving an input signal; local means for generating a train of regular periodic output timing signals; means for comparing the time phase relationship between the input signal and the output timing signals; said comparing means including means for generating a signal representing the algebraic sum of time phase differences; means for periodically sampling the condition of said summing means; means under control of said sampling means for altering the phase of said local means output signals to bring said output timing signals into phase with said input signal.

18. A digital signal synchronizing means comprising means for receiving an input signal; local means for generating a train of regular periodic output timing signals; means for comparing the time phase relationship between the input signal and the output timing signals; said comparing means including means for generating a signal representing the algebraic sum of time phase differences; means for periodically sampling the condition of said summing means; means under control of said sampling means for altering the phase of said local means output signals to bring said output timing signals into phase with said input signal; said sampling means including means for adjusting the sampling period to any desired time rate.

19. A digital signal synchronizing means comprising means for receiving an input signal; local means for generating a train of regular periodic output timing signals; means for comparing the time phase relationship between the input signal and the output timing signals; said comparing means including means for generating a signal representing the algebraic sum of time phase differences; means for periodically sampling the condition of said summing means; means under control of said sampling means for altering the phase of said local means output signals to bring said output timing signals into phase with said input signal; said summing means including fast time integrating means for summing said difference signals.

References Cited in the file of this patent

UNITED STATES PATENTS

| | | |
|---|---|---|
| 2,786,134 | Shellhorn | Mar. 19, 1957 |
| 2,934,604 | Bizet | Apr. 26, 1960 |
| 3,033,928 | Biggam et al. | May 8, 1962 |